United States Patent
Krammer et al.

(10) Patent No.: US 11,059,377 B2
(45) Date of Patent: Jul. 13, 2021

(54) CHARGING DEVICE FOR CHARGING AN ELECTRICALLY DRIVEN MOTOR VEHICLE HAVING ACCESS TO A DATA NETWORK AND METHOD FOR OPERATING A CHARGING DEVICE OF THIS KIND

(71) Applicant: AUDI AG, Ingolstadt (DE)

(72) Inventors: Johann Krammer, Ingolstadt (DE); Dominik Kniffka, Berching (DE); Gerhard Paris, Ingolstadt (DE); Axel Vogel, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 142 days.

(21) Appl. No.: 16/481,988

(22) PCT Filed: Feb. 5, 2018

(86) PCT No.: PCT/EP2018/052762
§ 371 (c)(1),
(2) Date: Jul. 30, 2019

(87) PCT Pub. No.: WO2018/153641
PCT Pub. Date: Aug. 30, 2018

(65) Prior Publication Data
US 2019/0389322 A1 Dec. 26, 2019

(30) Foreign Application Priority Data
Feb. 21, 2017 (DE) .................. 10 2017 202 745.2

(51) Int. Cl.
*B60L 53/30* (2019.01)
*B60L 53/66* (2019.01)
(Continued)

(52) U.S. Cl.
CPC .............. *B60L 53/305* (2019.02); *B60L 53/18* (2019.02); *B60L 53/65* (2019.02); *B60L 53/66* (2019.02);
(Continued)

(58) Field of Classification Search
CPC ................. B60L 53/305; B60L 53/66
(Continued)

(56) References Cited

U.S. PATENT DOCUMENTS

2010/0076825 A1* 3/2010 Sato .................. B60L 55/00
705/14.1
2010/0315197 A1* 12/2010 Solomon ............... G06F 21/31
340/5.2
(Continued)

FOREIGN PATENT DOCUMENTS

DE 102009045711 A1 4/2010
DE 102009019753 A1 11/2010
(Continued)

OTHER PUBLICATIONS

International Preliminary Report on Patentability (Chapter II) dated Aug. 22, 2019, in corresponding International application No. PCT/EP2018/052762; 6 pages.
(Continued)

*Primary Examiner* — Suchin Parihar
(74) *Attorney, Agent, or Firm* — Maier & Maier, PLLC

(57) ABSTRACT

A charging device including a first interface, by which the first connection between the charging device and a local network can be established; a second interface by which a second connection between the motor vehicle and the charging device can be established so that when the first connection is established, a data exchange between the local network and the motor vehicle is possible; at least one further interface by which a further connection between a
(Continued)

further participant and the charging device can be established so that when the first connection is established, a data exchange between the local network and the further participant is possible; and a control device that is designed to request a predefined certificate from the vehicle and to establish the further connection without requesting and authenticating the predefined certificate.

8 Claims, 2 Drawing Sheets

(51) Int. Cl.
  *B60L 53/18* (2019.01)
  *B60L 53/65* (2019.01)
  *H04W 12/069* (2021.01)
(52) U.S. Cl.
  CPC ....... *H04W 12/069* (2021.01); *B60L 2270/00* (2013.01)
(58) Field of Classification Search
  USPC ........................................................ 320/109
  See application file for complete search history.

(56) References Cited

U.S. PATENT DOCUMENTS

| | | |
|---|---|---|
| 2012/0150670 A1 | 6/2012 | Taylor et al. |
| 2013/0029595 A1 | 1/2013 | Widmer et al. |
| 2013/0160086 A1* | 6/2013 | Katar ...................... H04L 63/08 726/4 |
| 2014/0211863 A1 | 7/2014 | Katar et al. |
| 2015/0015419 A1* | 1/2015 | Halker .................. B60L 53/122 340/901 |
| 2015/0123619 A1 | 5/2015 | Marathe et al. |
| 2015/0183333 A1 | 7/2015 | Forbes, Jr. et al. |
| 2018/0074485 A1* | 3/2018 | Krishnamoorthy .. G08G 5/0069 |
| 2018/0111494 A1* | 4/2018 | Penilla ................... G06Q 20/18 |
| 2020/0148069 A1* | 5/2020 | Heuer ..................... B60L 53/31 |
| 2020/0164759 A1* | 5/2020 | Heuer .................. H04B 5/0081 |

FOREIGN PATENT DOCUMENTS

| | | |
|---|---|---|
| DE | 102010026689 A1 | 1/2012 |
| DE | 112010003507 T5 | 7/2012 |
| DE | 102011056651 A1 | 6/2013 |
| WO | 2013/019566 A1 | 2/2013 |

OTHER PUBLICATIONS

German Examination Report dated Nov. 30, 2017 in corresponding German Application No. 10 2017 202 745.2; 15 pages.
International Search Report and Written Opinion dated May 25, 2018 in corresponding International Application No. PCT/EP2018/052762; 24 pages.

* cited by examiner

CHARGING DEVICE FOR CHARGING AN ELECTRICALLY DRIVEN MOTOR VEHICLE HAVING ACCESS TO A DATA NETWORK AND METHOD FOR OPERATING A CHARGING DEVICE OF THIS KIND

FIELD

The invention relates to a charging device for charging an electrically driven motor vehicle and a method for operating the charging device.

BACKGROUND

It is possible to establish a connection for data exchange between the charging device and the electrically driven motor vehicle to be charged using charging devices for electrically driven motor vehicles. In addition, access to the Internet can be made available for the motor vehicle. To this end, the electrically driven motor vehicle requires an authentication based on a certificate in order to obtain access to this connection for the data exchange. However, it was previously not possible to allow other apparatuses aside from the electrically driven motor vehicle to participate in this connection for data exchange since the certificate-based authentication is issued only for motor vehicles.

Therefore, DE 10 2009 019 753 A1 shows a method and an arrangement for data communication between a service provider and a motor vehicle with an electric drive. The data communication connection between the motor vehicle and the service provider is established via a first wireless connection. If the motor vehicle is located at a charging station and is connected via a charging connection for charging the battery provided in the motor vehicle, another communication connection is established between the motor vehicle and the service provider via the charging station. However, such a connection is not made available for other apparatuses in addition to the motor vehicle.

DE 10 2011 056 651 A1 shows a computer column used as a receiving column, charging column, communication column, advertising platform or the like.

DE 10 2009 045 711 A1 shows a data transfer device, supply device and charging device with a data interface. It can transmit energy to an energy store as well as data concerning a motor vehicle or driver via a charging cable or an electrical line. This serves to update internal motor vehicle systems and to check them. Furthermore, the device can comprise a communication unit with which data can be received or transmitted even during travel without an electrical connection.

DE 11 2010 003 507 T5 shows a method for the data exchange between a motor vehicle and a server. The vehicle comprises a battery and a first communication unit. The server comprises a second communication unit. For the method, the first communication unit is connected to the second communication unit via a connection line. The connection line for charging the battery is constituted by a current supply unit or energy supply unit. An exchange of data between the first communication unit and the second communication unit is possible via the connection line.

WO 2013/019566 A1 shows systems, methods and apparatuses for a wireless data transfer. In one embodiment an energy transmission device is provided. It comprises a transmitter and a control circuit in order to establish a first wireless communication connection with an electric vehicle. The controller circuit can furthermore establish a second wireless communication network with the electric vehicle in order to detect whether the latter is charged.

These devices and methods shown in the prior art do not make possible access to a communication connection of a network to devices other than the electrically driven motor vehicle.

SUMMARY

The present invention has the problem of making a technical solution available with which an expansion of the range of the local network which is available to a vehicle by a charging device is made possible and is appropriate for the situation.

Advantageous further developments of the invention are described by the dependent claims, the following description and the figures.

The charging device according to the invention for charging an electrically driven motor vehicle comprises a first interface, a second interface, at least one other interface and a control device. A first connection between the charging device and a local network can be established by the first interface. A second connection between the electrically driven motor vehicle and the charging device can be established by the second interface so that when a first connection has been established, a data exchange is made possible between the local network and the motor vehicle. Another connection between another participant and the charging device can be established by the at least one other interface so that when the first connection has been established, a data exchange between the local network and the other participant is made possible. The control device is designed to query a given certificate from the motor vehicle and to establish the second connection only in case of a successful authentication using the certificate made available by the motor vehicle. The control device is designed to establish the second connection without querying and authentication of the given certificate.

The charging device according to the present invention is any device which is suitable for charging an electrically driven motor vehicle. For example, it can be a charging column such as, e.g. a direct current charging column for electrically driven motor vehicles, or a charging device comprising a mobile charging cable, preferably a mode 2 charging device according to the IEC 61851-1 standard.

The electrically driven motor vehicle according to the present invention can be, for example, an electric motor vehicle, a hybrid electric motor vehicle or a fuel cell vehicle.

The first interface, with which a first connection can be established between the charging device and the local network, is any intersection which is capable of establishing such a connection. According to the present invention, the first interface is preferably a WLAN (Wireless Local Area Network) interface or a PLC (Powerline Communication) interface of the charging device, wherein these can be connected to the local network. In the case of a PLC a data transmission takes place via a power cable.

The first connection is a connection between the charging device and the local network, e.g., a home network. Such a connection can be designed, for example, as a communication connection. A connection is generally characterized by the phases of the building up of the connection, of the data transmission and of the degradation of the connection.

According to the invention, a local network denotes a computer network such as is used, for example, in home networks or companies. This local network can be constructed, e.g., as a LAN (Local Area Network) or WLAN (Wireless Local Area Network). A local network can be constructed in technically different ways. The cabling of a local network typically takes place as a structured cabling beyond a certain size.

The second interface, with which a second connection can be established between the motor vehicle and the charging device, is any interface which can establish the second connection. The second interface is preferably designed as a plug of the charging device, especially preferably as a plug of the charging cable of the charging device. Such a plug can then be introduced into the associated interface of the electrically driven motor vehicle, thus establishing the second connection.

The second connection according to the present invention is any connection which establishes a connection between the motor vehicle and the charging device. This preferably takes place via the charging cable comprised by the charging device.

The other interface, with which another connection can be established between another participant and the charging device, is any other interface with which the other connection can be established. This preferably concerns a WLAN interface.

The other connection according to the present invention is any connection which can be produced between another participant and the charging device. The other connection is preferably a connection separate from the first connection. A separate connection is present if no data can be transmitted or received via an interface which generally makes possible the establishing of the connection. This means in the present case that no data exchange is possible from the electrically driven motor vehicle to the other participant and vice versa.//As a consequence, a first channel for the data exchange is formed between the local network and the other participant, preferably in the other connection established between the other participant and the charging device when the first connection has been established. This first channel is separate from a second channel. The second channel is formed when the second and the first connection have been established and makes possible the data exchange between the electrically driven motor vehicle and the local network. A separate channel means that the participants of the first channel cannot access the second channel and conversely the participants of the second channel can also not access the first channel.

The control device according to the present invention is any device capable of querying a certificate and of carrying out an authentication. A certificate is a digital data set which corroborates certain qualities of persons or of objects and whose authentication and integrity can be checked by cryptographic methods.

An authentication is, e.g. the inputting of login data, for example by username and password.

This asserts an identity of the user who inputs the login data. However, an authentication can also take place, e.g., by a given certificate. If a user possesses a given certificate which is queried by the server device, this is comparable to an input of login data. The checking of the asserted authentication, here of the given certificate of the motor vehicle, including the result of the check, is designated as authentication. In the present instance the authentication of the electrically driven motor vehicle takes place by the server device in order to ensure that it is authorized to access the local network.

Other participants in addition to the electrically driven motor vehicle are also capable of accessing a local network, for example, a home network of the user, by the charging device according to the invention. Consequently, the home network can be used to transmit rather large amounts of data to the other participants. In addition, the range of a local network such as, e.g., of a home network, can be broadened in such a manner by the charging device according to the invention that it is furthermore accessible in areas where the local network was as a rule no longer available, e.g. with WLAN, without a charging device. This can be the case, for example, in the garage area of a house where one now also has, for example, Internet access for his smartphone due to the enlarging of the local network. Consequently, the local network, for example in the form of a home network, can now be expanded to previously non-available areas with the charging device according to the invention and used there for other participants in addition to the electrically driven motor vehicle.

An advantageous embodiment of the invention provides that the charging device is a mode 2 charging device. The mode 2 charging device is a charging device in which the mode 2 is present for the charging of the electrically driven motor vehicle according to the international standard IEC 61851-1. The standard IEC 61851-1 concerns different charging modes for electrically driven motor vehicles. According to it, four charging modes are known for the charging of electrically driven motor vehicles. In a mode 2, the charging of the electrically driven motor vehicle takes place in a one- to three-phase manner by a hard-coded signal on the plug side. The mode 2 can also be designated as a class 2 charging mode or a type 2 charging operation.

Another advantageous embodiment of the invention provides that the charging device is designed to prevent a data exchange between the motor vehicle and the other participant if the second and other connection has been established. The term data exchange is to be understood as any exchange of data if there is a connection between the motor vehicle and the charging device or between the other participant and the charging device. However, a data exchange does not take place between the motor vehicle and the other participant. As a consequence of this prevented data exchange, data cannot pass from the motor vehicle to the other participant via the charging device and vice versa. This has advantages for data security. Furthermore, as a consequence, no transmission of a computer virus from the motor vehicle to the other participant or vice versa is possible.

According to another advantageous embodiment of the invention the other participant is a portable, mobile terminal, a Wireless Local Area Network (WLAN) receiver station, the electrically driven motor vehicle or another vehicle, in particular a motor vehicle with an internal combustion engine. The portable, mobile terminal can be, for example, a smartphone, a mobile telephone, a laptop or a notebook. This makes it possible for a user to also use the local network for his portable, mobile terminals. For these devices, the further connection via the other interfaces of the charging device can now be utilized in areas where the local network would not be available without a charging device. Furthermore, it is also possible for the electrically driven motor vehicle or also a motor vehicle with an internal combustion engine to utilize the other connection to the local network. In this manner, the user can also access the local network via the electrically driven motor vehicle even if the latter is not connected to the charging device, for example, via a charging cable of the charging device. The electrically driven motor vehicle can consequently also use the other interface. The same applies to a motor vehicle with an internal combustion engine which can access the local network, for example, by radio via the charging device. This offers very great flexibility for the user regarding his possibilities of using the local network.

Another advantageous embodiment of the invention provides that the other interface is designed as an Ethernet interface, a wireless local area interface, a Bluetooth interface, a ZigBee interface or a universal serial bus interface. Ethernet is a technology which specifies the software and hardware for cable-bound data networks which was initially conceived for local data networks (LANs) and is therefore also designated as LAN technology. Wireless local area network designates a local radio network. Bluetooth is an industry standard according to IEEE 802.15.1 for the transmission of data between devices over a short distance by radio technology (WPAN). ZigBee is a specification for wireless networks with a low data occurrence such as, e.g., house automation, sensor networks or light technology. The focus of ZigBee is in short-range networks (10 to 100 meters). However, ranges of several kilometers are also possible. The ZigBee specification expands the IEEE 802.15.4 standard by a network layer and application layer. The Universal Serial Bus (USB) is a serial bus system for connecting a computer to external devices. This offers great flexibility to the user as regards the further interface, which can be used in many ways, both without cable as well as via cable.

Another advantageous embodiment of the invention provides that a charging cable of the charging device comprises the second interface so that during the charging of the electrically driven motor vehicle the second connection can be established via the charging cable. As soon as the charging cable of the charging device has been plugged into the electrically driven motor vehicle, the query for the certificate and an authentication is carried out. Consequently, the second connection via the second interface between the electrically driven motor vehicle and the charging device is only established if there is a connection of the electrically driven motor vehicle to the charging device, e.g., via the charging cable of the charging device. This has the advantage that during the charging process of the electrically driven motor vehicle, access to the local network is made possible for its user. Data transmission expenses are reduced, and greater data amounts can be loaded via the local network of the user.

Furthermore, a method for operating the charging device according to the invention is provided. In the method according to the invention for operating the charging device according to the invention or an advantageous embodiment of the charging device according to the invention a first connection is established between the charging device and a local network via a first interface of the charging device. A given certificate is queried from an electrically driven motor vehicle by a control device of the charging device and a second connection is established only in the case of a successful authentication using the certificate made available by the motor vehicle via a second interface of the charging device between the motor vehicle and the charging device. This makes possible a data exchange between the local network and the electrically driven motor vehicle when the first connection has been established. Another connection is established between another participant and the charging device via at least one other interface of the charging device so that when the first connection has been established, a data exchange between the local network and the other participant is made possible. The other connection is established here without a query and authentication.

Now, other participants can access a local network by the method according to the invention. This is possible without a query and authentication via a given certificate. Previously, it was only possible for an electrically driven motor vehicle to obtain access to a local network via a charging device based upon an authentication procedure by a certificate. The fact that this is now also possible for other participants minimizes the expense for data transmission. Now, even larger data amounts can be load via the other participant in areas where the local network is as a rule no longer available without a charging device.

An advantageous embodiment of the method provides that once a first connection has been produced, a data exchange via the Internet is made possible for the second connection and/or another connection. This allows, for example, software updates for the motor vehicle, the uploading of collected traffic data, the downloading of new music or the updating of social networks to be carried out by the second and/or other connection.

Another advantageous embodiment of the method provides that for the connection to the local network as well as for the establishing of the first, second and/or other connection the same access data is queried, wherein the same name is given in particular for the network as well as for the connections made available by the charging device. The connections which can be made available by the charging device comprise the first, second and other connection. This means that the charging device serves as a repeater and broadens the range of the local network. A repeater in communication technology is an electrical or optical signal amplifier or a device which prepares a signal for increasing the range of a signal. A repeater is located at some distance from the transmitter, receives its signals and transmits them further in prepared form, and as a consequence a greater distance can be bridged. The range of the network is increased as a consequence. When using digital transmission methods the signal can be additionally decoded by the repeater, which removes signal disturbances such as static or distortions of the pulse shape. The signal is subsequently recoded and modulated and transmitted further. This has, e.g., the result that the other participant such as, for example a smartphone, now continues to have good Internet access in areas in which there would be no or only poor Internet access without an extension of the network. Furthermore, this has the advantages that with a simplified, practical method the names of networks do not have to be changed. The user does not have to make note of several network names or of access data.

The invention also comprises further developments of the method according to the invention which comprise features like those already described in conjunction with the further developments of the charging device according to the invention. For this reason the corresponding further developments of the method according to the invention will not be described again here.

BRIEF DESCRIPTION OF THE DRAWINGS

Exemplary embodiments of the invention are described in the following. To this end.

Figure 1:
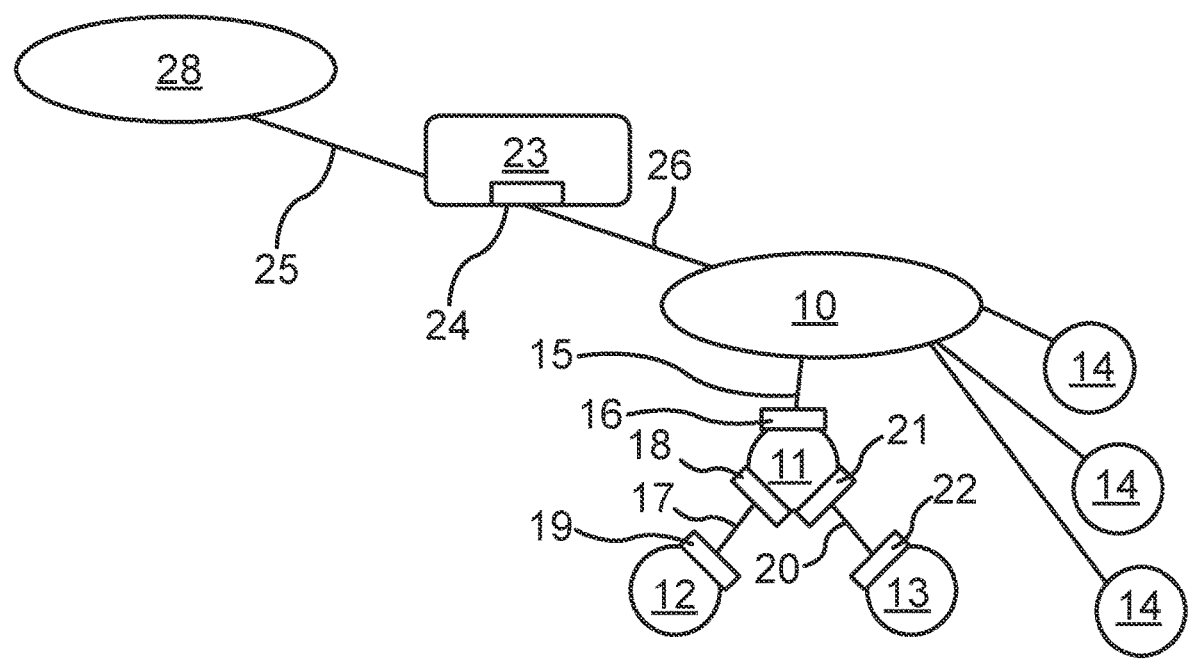
FIG. 1 shows a schematic view of a charging device for an electrically driven motor vehicle, a home network made available by a router and several connections established between the charging device, the electrically driven motor vehicle, other participants and the home network.

The exemplary embodiments explained in the following are preferred embodiments of the invention. In the exemplary embodiments the described components of the embodiments represent individual features of the invention which are to be considered independently of each other, which further develop the invention even independently of each other and are therefore to be considered even individually or in a different combination than the one shown as components of the invention. Furthermore, the described embodiments can also be supplemented by other embodiments of the already described features of the invention.

In the figures, elements which have the same function are provided with the same reference numerals.

DETAILED DESCRIPTION

FIG. 1 shows a local network 10. In the following, the local network 10 is by way of example in the home network of a user which is available, e.g., in the residence of the user. FIG. 1 shows a router 23 with an interface 24. This router 23 is connected in FIG. 1 by a connection 26 to the home network 10. This connection 26 is only for illustration and has been included in FIG. 1 only for a simplified view. In practice, the router 23 will make the home network 10 available and will directly connect via its interface 24 to other participants, e.g., to a charging device 11 via the first interface 16 of the charging device 11. The router 23 makes Internet 28 available via a connection 25.

The home network 10 is connected via a first connection 15 by the first interface 16 of the charging device 11 to the charging device 11. The charging device 11 comprises a second interface 18 which makes a second connection 17 to an electrically driven motor vehicle 12 via an appropriate interface 19 of the electrically driven motor vehicle 12. As a result, the motor vehicle 12 gets access to the home network 10 in the user's home by the charging device 11 via the first connection 15.

Furthermore, the charging device 11 comprises another interface 21 by which another connection 20 to another participant 13 can be established. The other participant is always a smartphone 13 in the following. However, it can also be any other portable, mobile terminal. This smartphone 13 also has an interface 22 in order to be able to enter the third connection 20 to the charging device 11.

Furthermore, yet other participants 14 can be connected to the home network 10 in the house. In the following, by way of example, they are another smartphone, a laptop and a desktop computer in the user's house and which access the home network 10. Therefore, there are participants which are connected to the router 23 and as a result can exchange data with each other via the home network 10 and also have access to the Internet 28.

The charging device 11 comprises in the present case a mobile charging cable for charging the electrically driven motor vehicle 12 and is in the present case, e.g., a mode 2 charging device. The first interface 16 of the charging device by which the first connection 15 can be established between the charging device 11 and the home network 10 is, for example, designed as a WLAN interface of the charging device 11. As a consequence, the charging device 11 can access the home network 10 in the house.

The second interface 18 of the charging device 11 by which a second connection 17 can be established between the motor vehicle 12 and the charging device 11 makes possible a data exchange between the home network 10 and the motor vehicle 12 when the first connection 15 has been established. In the present case the second interface 18 is located, e.g., in the charging cable of the charging device 11 so that during the charging of the electrically driven motor vehicle 12 the second connection 17 can only be established via the charging cable of the charging device 11.

A data exchange between the home network 10 and the smartphone 13 is made possible via another interface 22 with which another connection 20 can be established between the smartphone 13 and the charging device 11 when the first connection 15 has been established. For example, the Internet 28 can be accessed via the data exchange, wherein, e.g., data can be downloaded to the smartphone 13.

A control device of the charging device is not shown in FIG. 1. However, it is part of the charging device 11. The control device is designed to query a given certificate from the electrically driven motor vehicle 12 and to establish the second connection 17 only in the case of a successful authentication using the certificate made available by the motor vehicle 12 and to establish the other connection 20 without querying or authenticating the given certificate. Consequently, the motor vehicle 12 requires a certificate in order to obtain access to the Internet 28 via the home network 10, while this is not necessary for other participants such as, for example, the smartphone 13.

A data exchange between the motor vehicle 12 and the smartphone 13 is not possible, even in the case of an established second and other connections 17 and 20. This has the advantage that data from the motor vehicle 12 cannot pass via the charging device 11 to the smartphone 13 and vice versa. This is very advantageous for reasons of safety and data protection. Furthermore, computer viruses cannot be transferred from the smartphone 13 to the motor vehicle 12 and vice versa. The other interface 22 is designed in the present instance, e.g., as a WLAN interface.

A method for operating the charging device 11 is explained in the following. In the following it should be assumed initially that the other participant is a smartphone 13 and that the range of the home network 10 is expanded in such a manner by the method that the smartphone 13 also has access to the Internet 28.

A home network 10 is present in the house of a user. The router 23 makes the home network 10 available and therefore also a connection 25 to the Internet 28. The range of the home network 10 is naturally limited and therefore extends, for example, only to the garage of the house. The charging device 11 is located there, and is, e.g., a mode 2 charging device comprising a mobile charging cable which can be fastened to a wall holder.

The method now expands the range of the home network 10 in such a manner that even the charging device 11 with the charging cable can access the home network 10 and has access to the Internet 28. The charging cable is connected via the appropriate interfaces 18, 19 to the electrically driven motor vehicle 12. In this manner, the electrically driven motor vehicle 12 obtains access to the Internet 28.

The smartphone 13 can also obtain access to the Internet 28 via the other interface 21 of the charging device. The data exchange between smartphone 13 and the home network 10 takes place with the established connection 15 of the charging device 11. The associated first interface 16 of the charging device 11 is designed, for example, as a WLAN interface.

Therefore, the charging device 11 expands the access area to the home network 10. Therefore, larger amounts of data can be loaded via the home network 10 such as, for example, performing software updates for the motor vehicle 12 or collected traffic data, the downloading of new music and/or the updating of social networks via the smartphone 13. No transmission costs are generated for the automobile manufacturer as a result. As a rule, a SIM card is built into the motor vehicle 12. If costs now arise for data transmissions via the SIM card, they would be at the expense of the automobile manufacturer. This can be avoided by the charging device 11.

Figure 2:
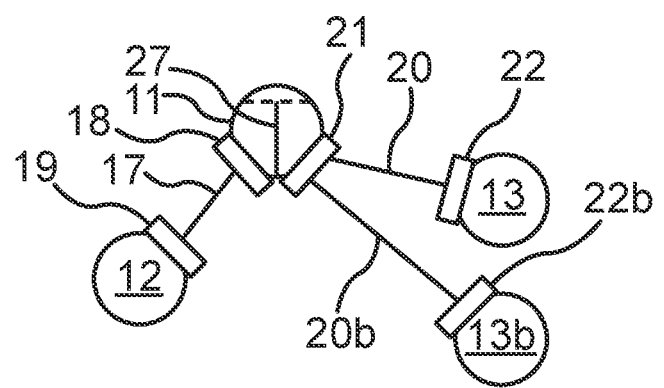
FIG. 2 shows another schematic view in which the charging device is shown and blocking of data exchange between the motor vehicle connected to the charging device and between two other participants connected to the charging device is shown.

FIG. 2 shows another schematic view in which the charging device 11 is shown and prevention of a data exchange between the motor vehicle 12 connected to the charging device 11 and between two other participants 13, 13b connected to the charging device 11 is demonstrated.

FIG. 2 therefore differs from FIG. 1 in that another participant in addition to the smartphone 13, for example a laptop 13b, can obtain access to the Internet 28 via the charging device 11. Furthermore, FIG. 2 additionally shows a barrier 27 which prevents a data exchange from taking place between the smartphone 13 or the laptop 13b and the motor vehicle 12. This makes possible an improved data protection and increases the safety for the user. Furthermore, no computer viruses can be transmitted from the smartphone 13 or from the laptop 13b onto the motor vehicle 12 and vice versa through the barrier 27.

The invention claimed is:

1. A charging device for charging an electrically powered motor vehicle, comprising:
 a first interface, via which a first communications link can be established between the charging device and a local network;
 a second interface, via which a second communications link can be established between the motor vehicle and the charging device, such that when the first communications link is established, the motor vehicle may gain access to the local network; and
 at least one additional interface, via which an additional communications link can be established between an additional participant and the charging device, such that when the first communications link is established, the additional participant may gain access to the local network,
 wherein the charging device is configured to:
  query a specific certificate from the motor vehicle, and to establish the second communications link only in the event of a successful authentication of the certificate provided by the motor vehicle; and
  establish the additional communications link without querying and authenticating the specified certificate,
 wherein the charging device is configured to prevent an exchange of data between the motor vehicle and the additional participant when the second communications link and the additional communications link are established.

2. The charging device according to claim 1, wherein the charging device is a Mode 2 charging device.

3. The charging device according to claim 1, wherein the additional participant is a portable mobile end device, a Wireless Local Area Network receiver station, the motor vehicle or another motor vehicle.

4. The charging device according to claim 1, wherein the additional interface is designed as an ethernet, a Wireless Local Area Network, a Bluetooth, a ZigBee, or as a Universal Serial Bus interface.

5. The charging device according to claim 1, wherein the charging cable of the charging device comprises the second interface, such that during the charging of the electrically powered motor vehicle, the second communications link can be established via the charging cable.

6. A method for operating a charging device comprising,
 establishing a first communications link between the charging device and a local network via a first interface of the charging device;
 querying a specific certificate from a motor vehicle via the charging device;
 establishing a second communications link between the motor vehicle and the charging device via a second interface of the charging device only upon a successful authentication, by the charging device, of the specific certificate provided by the motor vehicle, such that when the first communications link is established, the motor vehicle may gain access the local network;
 establishing an additional communications link between an additional participant and the charging device via at least one additional interface of the charging device, such that when the first communications link is established, the additional participant may gain access the local network,
 wherein the additional communications link is established without querying and authenticating the specific certificate, and
 wherein the charging device is designed to prevent an exchange of data between the motor vehicle and the additional participant when the second and the additional communications link are established.

7. The method according to claim 6, wherein when the first communications link is established, an exchange of data with the internet through the local network is made possible for the second communications link and/or for the additional communications link.

8. The method according to claim 6, wherein for connecting with the local network and for establishing the first, second, and/or additional communications link, identical access data are queried, wherein in particular for the local network and for the communications links that can be established via the charging device, an identical name is given.

* * * * *